Jan. 23, 1962 W. E. RANEY 3,018,086
TRACTOR DEVICE FOR CONDUITS AND THE LIKE
Filed Oct. 14, 1957 2 Sheets-Sheet 1
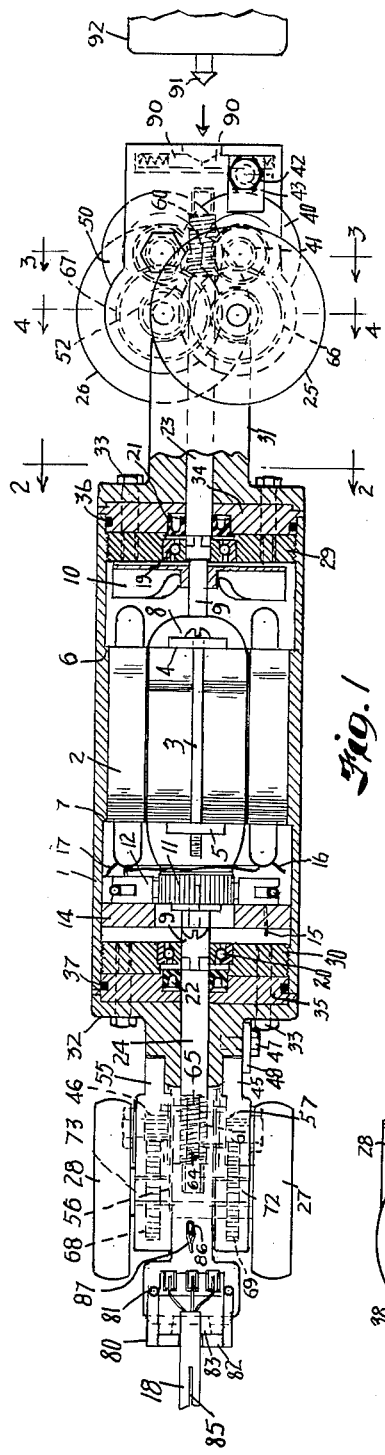
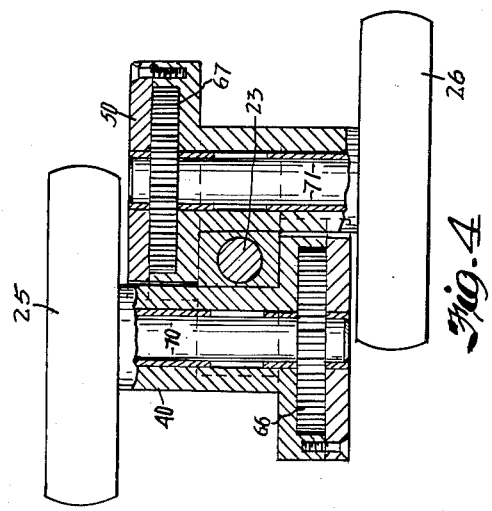
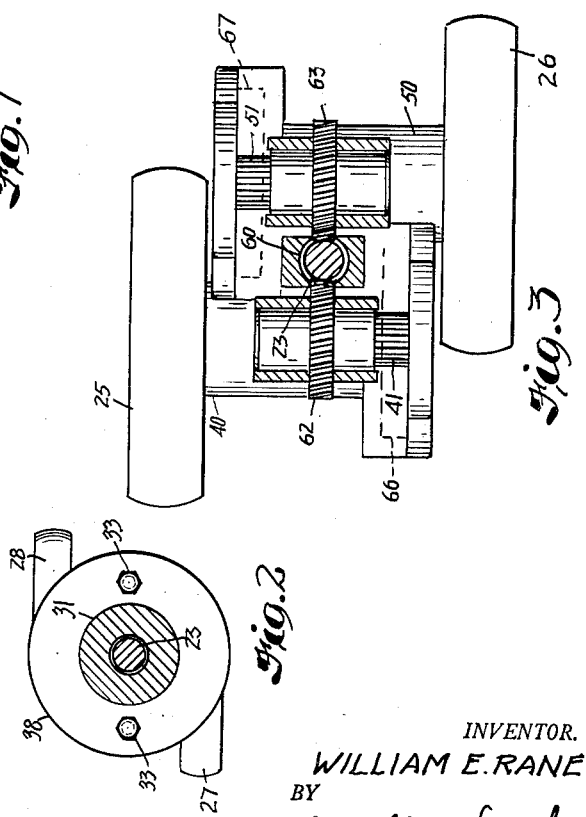
INVENTOR.
WILLIAM E. RANEY
BY
Oberlin & Limbach
ATTORNEYS.

Jan. 23, 1962  W. E. RANEY  3,018,086
TRACTOR DEVICE FOR CONDUITS AND THE LIKE
Filed Oct. 14, 1957  2 Sheets-Sheet 2

INVENTOR.
WILLIAM E. RANEY
BY
Oberlin & Limbach
ATTORNEYS.

United States Patent Office 3,018,086
Patented Jan. 23, 1962

3,018,086
TRACTOR DEVICE FOR CONDUITS AND THE LIKE
William E. Raney, Rocky River, Ohio, assignor to Raney Products Incorporated, Cleveland, Ohio, a corporation of Ohio
Filed Oct. 14, 1957, Ser. No. 690,083
11 Claims. (Cl. 254—134.5)

The present invention relates generally as indicated, to a tractor device for conduits and the like and, more particularly, to a power driven tractor device or so-called "ferret" that is adapted to be inserted in one end of a conduit to pull through the conduit a strong steel wire or the like, to which, in turn, a winch cable is adapted to be secured and pulled into the conduit from the opposite end by means of such strong steel wire. An electric cable is then secured to the winch cable for drawing through the conduit.

It is a primary object of this invention to provide a tractor device of the character indicated which is reversible so as to be capable of moving in opposite directions through a conduit.

It is another object of this invention to provide a tractor device which is supported clear of the conduit walls by motor-driven wheels, said wheels being adjustable to enable movement of said device through any of a large variety of sizes and cross-section shapes of conduits.

It is another object of this invention to provide a tractor device in which certain of the drive wheels are spring-loaded so that all drive wheels will frictionally engage the walls of the conduit for effective driving of the device through the conduit.

It is still another object of this invention to provide a tractor device which at one end thereof is provided with a coupling to which another similar device may be coupled so that both devices may be driven in the same direction in the event that an exceptionally long conduit is encountered.

It is still another object of this invention to provide a unique drive mechanism for the drive wheels which is comparatively small in diameter, but which, through a large and efficient gear reduction, is effective to transform the high speed operation of a small drive motor to slow speed, high torque driving of the wheels.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation view, partly in cross-section, showing one form of the present invention;

FIG. 2 is a transverse cross-section view taken substantially along the line 2—2, FIG. 1;

Figure 5:
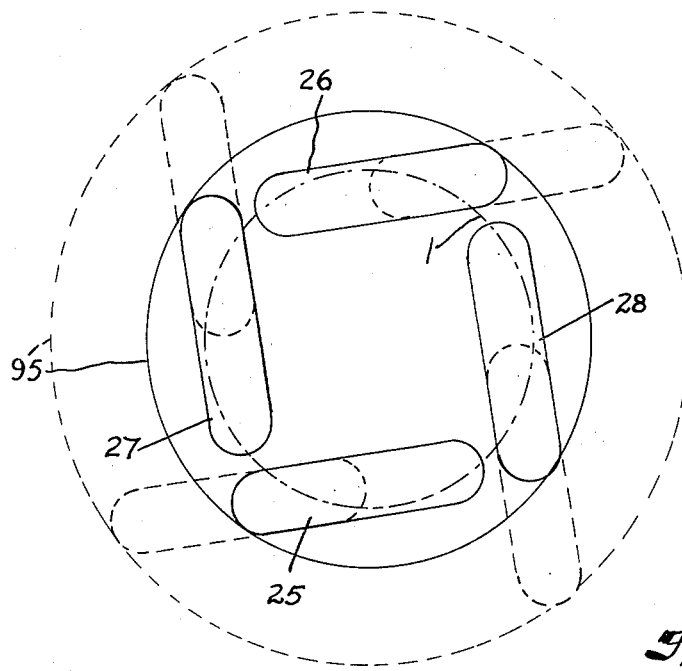
Figure 6:
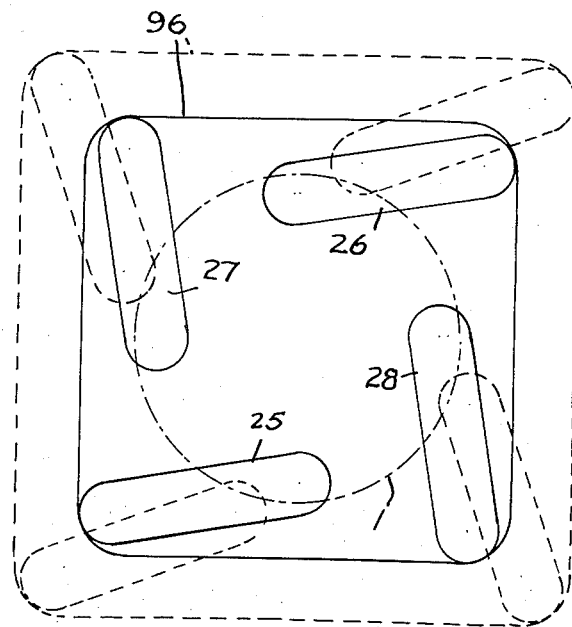

FIGS. 3 and 4 are cross-section views taken substantially along the lines 3—3 and 4—4 of FIG. 1; and FIGS. 5 and 6 show how this tractor device is readily adjusted for travel through round and square conduits of different sizes.

Referring now more particularly to the drawings, the tractor device or "ferret" herein disclosed comprises a tubular motor housing 1 in which the stator 2 of an electric drive motor is secured, as by means of bolts 3 and arcuate clamping plates 4 and 5 which engage the respective shoulders 6 and 7 and the respective ends of the laminated body of the stator. Rotatable within the stator 2 is the electric motor rotor 8 which has a double-ended shaft 9, there being a fan 10 adjacent one end of the rotor and in the case of a universal type motor a commutator 11 at the other end. The reference numerals 12 and 14 designate the brush holder and the brush holder plate respectively. There are provided three leads 15, 16, and 17 which are connected in conventional manner with the three-conductor cable 18 whereby the rotor 8 is driven in one direction or the other in accordance with which of the leads 15, 16, and 17 are connected together through a switch (not shown) provided at the far end of the cable 18.

The ends of the rotor shaft 9 are journalled in antifriction bearings 19 and 20 adjacent which are provided conventional bearing seals 21 and 22 and keyed to the ends of the rotor shaft are the drive shafts 23 and 24 for the respective pairs of drive wheels 25, 26 and 27, 28 disposed adjacent the ends of the tubular housing 1.

Screwed into the opposite ends of the tubular housing are bearing support rings 29 and 30 and the wheel mounts 31 and 32 are secured as by means of a pair of screws 33 that have threaded engagement with the respective rings 29 and 30, there being interposed between each wheel mount 31 and 32 and the respective rings 29 and 30 a bearing seal-carrying ring 34 and 35 which carries an O-ring or like packing ring 36 and 37 respectively. When screws 33 are tightened the mounts 31 and 32 are drawn into frictional engagement with the ends of housing 1, or optionally with flanges of rings 34 and 35 that abut the ends of housing 1.

The wheel mounts 31 and 32 at the ends of the "ferret," as shown in FIG. 1, are rotatably adjustable about the longitudinal axis of the housing 1, for a purpose which will appear hereinafter. Thus, by loosening the screws 33, the wheel mounts 31 and 32 together with rings 29 and 30 and 34 and 35 may be rotated in one direction or the other and locked in adjusted position by retightening said screws 33. It will thus be seen that rings 29 and 30 are threaded into housing 1 and that screws 33 are threaded into rings 29 and 30. Thus, by tightening the screws 33, the mounts 31 and 32 or the rings 34 and 35, as the case may be, will be drawn into clamping engagement with the end of the housing 1 and thus be precluded from rotational movement.

The drive wheel 25 is journalled in a wheel housing 40 that is rockably mounted on mount 31 about the axis of the drive pinion 41 to vary the distance between the periphery of the wheel 25 and the periphery of the tubular housing 1. The wheel housing 40 is locked in desired adjusted position as by means of the screw 42 which clamps the plate 43 against the side of the wheel housing 40.

At the other end of the "ferret" on mount 32 there is provided a similarly adjustable drive wheel 27 in which the housing 45 is rockably mounted about the axis of the drive pinion 46 and is locked in adjusted position as by means of the screw 47 and clamping plate 48.

The drive wheel 26 is journalled in a wheel housing 50 that is also pivotally mounted about the axis of a drive pinion 51, but, in this case, the wheel housing 50 is actuated by the torsion spring 52 which tends to constantly, yieldably move said wheel 26 in a direction to frictionally engage the wall portion of a conduit opposite to that engaged by wheel 25.

Similarly, the fourth driving wheel 28 is carried in a pivotally mounted housing 55 upon which a torsion spring 56 bears to urge that wheel 28 into frictional engagement with the wall portion of the conduit opposite to that engaged by wheel 27. The housing 55 swings about the axis of a drive pinion 57.

Driving of the two pairs of wheels at the respective ends of the tractor device is effected as by means of worms 60 and 61 formed on the respective drive shafts 23 and 24 meshing with worm wheels 62—63 and 64—65 which are journalled in the respective wheel mounts 31 and 32, as on bushings, and in turn, each worm wheel is provided with a drive pinion 41, 51, 46, and 57 respectively at one end which mesh with gears 66—67; 68—69 keyed onto the shafts 70—71; 72—73 of the respective drive wheels 25—26; 27—28.

A notable feature of this invention is that the spring-loaded wheels 26 and 28, when driven, tend to help the respective torsion springs in maintaining contact between the peripheries of said wheels and the wall of the conduit contacted thereby.

The cable 18 for conducting electric power for operation of the motor is secured in a water-tight manner at the end of the wheel mount 32, there being a screw-threaded bushing 80 that engages an O-ring 81 forming a seal and, in addition, there is provided another bushing 82 which is threaded to squeeze the packing ring 83 around the cable 18 proper. Extending alongside said cable 18 is a strong steel or like wire 85 which is hooked to an eye 86 provided on the wheel mount 32.

Accordingly, when the "ferret" has had its wheels 25 and 27 properly adjusted in accordance with the shape and size of the conduit, it is inserted into said conduit and the drive motor is energized to cause the ferret to travel into the conduit pulling therewith its cable 18 and the steel wire 85 hooked thereto. When the ferret reaches the other end of the conduit it, and its cable 18, is pulled out therethrough, or else its cable 18 may be disconnected and pulled back in the opposite direction and at the same time a winch cable (not shown) may be secured to the loop 87 at the end of the steel wire 85. In this way, the winch cable (not shown), is pulled into the conduit and when it reaches the end, the conductor or cable which is to be drawn into the conduit is attached to the end of the winch cable, whereupon, the winch drum may be energized to pull the winch cable and conductor through the conduit.

The wheel mount 31 is provided at its end with a pair of spring-loaded coupling plates 90 which are adapted to cooperate with the coupling element 91 formed at the end of another similar ferret 92. Thus, when the ferret 92 is moved to the left its coupling element 91 will force the coupling plates 90 apart whereupon the latter will engage behind the shoulder of the coupling element 91. Now both electric drive motors of the two ferrets may be energized to travel in unison to pull in the steel wire 85, it having been found desirable, as in conduits which are 1000 feet long or longer to employ two ferrets in tandem instead of trying to provide the necessary power in a single ferret.

Referring to the schematic diagrams of FIGS. 5 and 6, it can be seen that for round conduits 95 of different sizes all that one has to do is to adjust the wheels 25 and 27 at the ends of the tractor device whereby the motor housing 1 will be centered in each case and can travel along curves in the conduit and that for square conduits 96 of different sizes it is desirable to rotatably adjust the wheels 25—26 with respect to wheels 27—28 about the axis of the motor housing 1 in addition to adjusting the wheels 25 and 27.

It can thus be seen that I have provided a simple and compact reversible electric tractor device in which all four wheels 25—26 and 27—28 are driven and all four wheels make frictional contact with the walls of the conduit and serve to support the motor housing 1 clear of such walls, whereby the ferret is capable of following any curves that may be encountered in the conduits without causing binding between the motor housing 1 and the walls of the conduit.

As an example the drive motor may have a no load rotor speed of 15,000 r.p.m. (7000 r.p.m. under load) and the gear reduction is preferably such that the tractor device will travel at a rate of about 70 feet per minute.

Other modes of applying the principle of the invention may be employed, change being made as regards the details described, provided the features stated in any of the following claims, or the equivalent of such, be employed.

I therefore particularly point out and distinctly claim as my invention:

1. A tractor device adapted to be propelled through a conduit and the like comprising a motor housing having a drive motor therein; wheel mounts at the respective ends of said housing; a pair of wheels carried by each mount for rotation about parallel axes and arranged to frictionally engage the walls of a conduit, means for relatively rotatively adjusting one wheel mount with respect to the other, the pair of wheels at one end being rotatively displaced with respect to the pair of wheels at the other end so as to support said housing clear of the conduit walls; and drive shafts coupled to the respective ends of said drive motor and operatively connected to the respective pairs of wheels to drive the latter.

2. The tractor device of claim 1 wherein each wheel of the respective pairs of wheels is journalled in a wheel housing, and wherein said wheel housings are mounted on the respective wheel mounts for swinging movement abount axes parallel to the axes of rotation of the respective wheels.

3. The tractor device of claim 1 wherein said drive motor is reversible for propelling said device in opposite directions.

4. The tractor device of claim 1 wherein a worm drive is embodied between each pair of wheels and the respective drive shaft.

5. The tractor device of claim 1 wherein each wheel of the respective pairs of wheels is journaled in a wheel housing, wherein said wheel housings are mounted on the respective wheel mounts for swinging movement about axes parallel to the axes of rotation of the respective wheels, wherein means are provided for adjustably locking one wheel housing at the respective ends, and wherein spring means are provided for yieldably swinging the other wheel housing at the respective ends outwardly to frictionally press the wheel journalled therein against the wall of the conduit.

6. The tractor device of claim 1 wherein said drive motor is a reversible electric motor, wherein an electric cable is connected to one wheel mount to control said drive motor, wherein said one wheel mount is provided with means for securing a pulling wire thereto which it is desired to draw into a conduit when said device is propelled therethrough.

7. The tractor device of claim 1 wherein one wheel mount is provided with a coupling to which another similar tractor device may be coupled for facilitating propulsion through a conduit.

8. A tractor device adapted to be propelled through a conduit and the like comprising a tubular housing, coaxial wheel mounts at the respective ends of said housing, a drive motor in said housing having a double-ended drive shaft extending into the respective wheel mounts, a pair of wheel housings carried by each wheel mount for pivotal movement about parallel axes that are transverse to the longitudinal axis of said tubular housing, a wheel journalled in each wheel housing for rotation about an axis parallel to the pivot axis of the respective wheel housing, means for driving each wheel from the respective ends of said drive shaft, and means for relatively rotatively adjusting one wheel mount with respect to the other.

9. The tractor device of claim 8 wherein said means for driving each wheel comprises a worm wheel in mesh with a worm formed on said drive shaft and a gear on said worm wheel in mesh with a gear on the respective wheel.

10. The tractor device of claim 8 wherein said tubular housing is closed at its ends by rings that have bearings and fluid seals for said drive shaft.

11. The tractor device of claim 8 wherein means are provided for locking one wheel housing of each wheel mount in selected pivoted position, and spring means operative to yieldably pivot outwardly the other wheel housing of each wheel mount whereby both wheels at the respective ends frictionally engage the walls of a conduit and serve to support said tubular housing clear of the conduit walls.

References Cited in the file of this patent

UNITED STATES PATENTS

| | | |
|---|---|---|
| 1,177,984 | Beene | Apr. 4, 1916 |
| 1,804,148 | Church | May 5, 1931 |
| 1,860,385 | Crapo | May 31, 1932 |
| 2,515,953 | Dufresne | July 18, 1950 |

FOREIGN PATENTS

| | | |
|---|---|---|
| 26,118 | Great Britain | of 1897 |